UNITED STATES PATENT OFFICE.

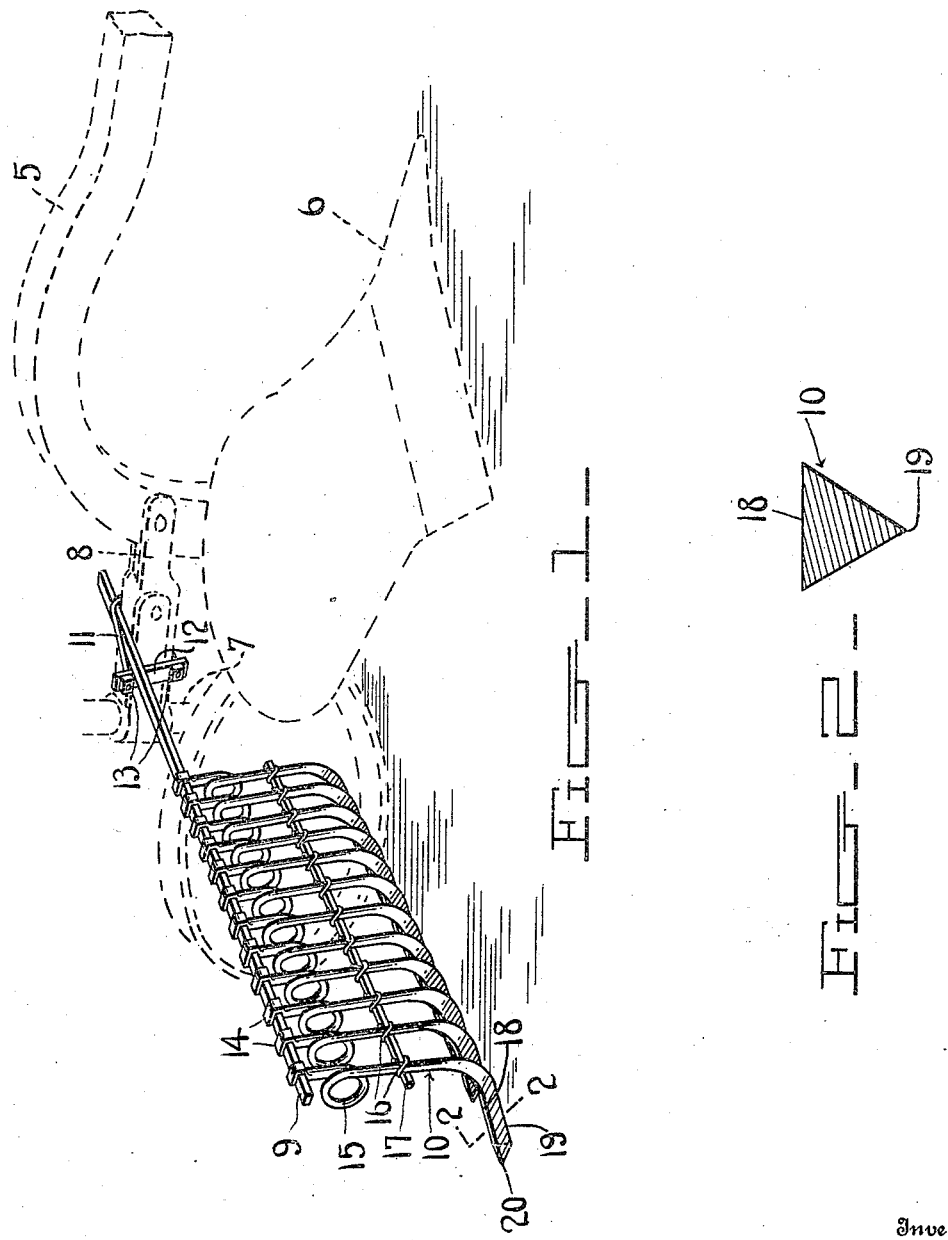

LEMUEL H. McCALL, OF CALLAWAY, NEBRASKA.

PLOW ATTACHMENT.

948,614. Specification of Letters Patent. Patented Feb. 8, 1910.

Application filed June 25, 1909. Serial No. 504,342.

*To all whom it may concern:*

Be it known that I, LEMUEL H. MCCALL, a citizen of the United States, residing at Callaway, in the county of Custer, State of Nebraska, have invented certain new and useful Improvements in Plow Attachments; and I do hereby declare the following to be a full, clear, and exact description of the invention, such as will enable others skilled in the art to which it appertains to make and use the same.

The present invention has reference to plow attachments, and it resides primarily, in the production of an extremely simple, inexpensive, and effective pulverizing device which may be readily attached to and subsequently removed from any ordinary type of plow now in use, the device being located directly in the rear of the plow share, so as to operate upon the soil turned up by the latter.

To this end, the pulverizer comprises a series of spring-metal knives whose upper ends are formed with eyes through which the supporting and attaching bar extends, and whose thickened lower portions are curved rearwardly, and are sharpened so as to provide cutting edges. These knives are further supported by means of a brace rod to which they are connected, said rod being arranged in spaced parallel relation to the attaching bar above-mentioned, the knives being formed with rearwardly projecting coils which are located intermediate said rod and bar.

The preferred embodiment of the invention is illustrated in the accompanying drawings, in which corresponding parts are designated by the same reference numerals throughout the several views, whereof:

Figure 1 is a fragmental perspective view illustrating the application of the invention. Fig. 2 is a section on line 2—2 of Fig. 1.

Referring more particularly to the drawings, 5 designates in a general manner the beam of a wheeled plow, 6 the plow share, and 7 the rear standard which is connected with the beam by the bracket 8. These parts may be of any preferred construction, and hence they appear in dotted lines in the drawings and are not described in detail.

The pulverizing attachment in which this invention resides comprises, essentially, a horizontal supporting bar 9 and a series of spring-metal knives 10 suspended therefrom and arranged in spaced parallel relation. The bar 9 projects across the upper face of the bracket 8 and is adjustably clamped thereto by a U-shaped clip 11, which straddles said bracket from one side and has the free threaded ends of its legs extending through openings in a metal strap 12 held against the opposite side face of the bracket by means of nuts 13 threaded upon said legs. This arrangement as is evident, permits the series of knives to be shifted as an entirety, toward and from the bracket. The stems of these knives terminate at their upper ends in eyes 14 through which bar 9 extends, and adjacent said eyes the stems are formed with rearwardly projecting coils 15. Below the coils, the knives are fastened by spring clips 16 to a brace rod 17 disposed parallel with said bar.

The lower or body portion 18 of each knife is gradually widened and thickened as shown, and said portion is curved rearwardly. The side faces of such portions are oppositely beveled or sharpened, so as to provide cutting edges 19 which are forced yieldingly toward the ground by the tension of the respective spring coils 15. The rear ends of these portions have a gradually decreasing width and terminate in points 20. During the movement of the plow, the widened and thickened portions of the knives, owing to their disposition rearwardly of the share, will be drawn under tension directly across the soil turned up by the latter, and the sharpened edges thereof will pulverize the same, as will be understood. The position of the series of knives as an entirety may, as above stated, be adjusted by loosening the nuts 13 and subsequently moving the supporting bar 9 in the proper direction.

While the invention has been shown and applied to a plow having a single share, it will be obvious that where the plow is provided with two or more shares, a corresponding number of attachments may be employed, each standard having fastened thereto, in such instance, a rearwardly-extending bracket to which one of the attachments may be secured.

What is claimed, is:—

1. The combination in a pulverizer, of a supporting bar adapted for attachment to a plow; and a series of spring-metal knives suspended from said bar and arranged in spaced parallel relation, each knife having its upper end formed with an eye through which the bar passes, and its lower portion thickened and curved rearwardly and provided with a sharpened lower edge.

2. The combination in a pulverizer, of a horizontal supporting bar adapted for attachment to a plow; a series of spring-metal knives suspended at their upper ends from said bar; a brace rod disposed below and parallel with said bar; and fastening devices for connecting said knives to said rod, each knife being formed with a rearwardly projecting coil located between said bar and rod.

3. The combination in a pulverizer, of a horizontal supporting bar adapted for attachment to a plow; a series of spring-metal knives suspended at their upper ends from said bar and having their lower portions thickened and curved rearwardly and provided with sharpened lower edges; a brace rod disposed below and parallel with said bar; and fastening devices for connecting said knives to said rod.

4. The combination in a pulverizer, of a horizontal supporting bar adapted for attachment to a plow; a series of spring-metal knives suspended at their upper ends from said bar and having their lower portions thickened and curved rearwardly and provided with sharpened lower edges, a brace rod disposed below and parallel with said bar; and fastening devices for connecting said knives to said rod, each knife being formed with a rearwardly projecting coil located between said bar and rod.

In testimony whereof, I affix my signature, in presence of two witnesses.

LEMUEL H. McCALL.

Witnesses:
G. H. LUTTER,
STEPHEN WILCOX.